United States Patent [19]

Irwin

[11] 4,072,487

[45] Feb. 7, 1978

[54] AIR CONDITIONING APPARATUS FOR TRACTOR CAB

[75] Inventor: Gordon A. Irwin, Harwood, N. Dak.

[73] Assignee: Steiger Tractor Inc., Fargo, N. Dak.

[21] Appl. No.: 749,361

[22] Filed: Dec. 10, 1976

[51] Int. Cl.[2] ............................................... B60H 3/04

[52] U.S. Cl. ...................................................... 62/244

[58] Field of Search ......................... 62/244, 239, 243; 180/54 R, 64 A, 69 C

[56] References Cited

U.S. PATENT DOCUMENTS

| | | | |
|---|---|---|---|
| 3,712,077 | 1/1973 | Dixon | 62/244 |
| 3,848,428 | 11/1974 | Rieter, Jr. | 62/244 |
| 3,983,715 | 10/1976 | Hair, Jr. et al. | 62/243 |

*Primary Examiner*—Lloyd L. King

*Attorney, Agent, or Firm*—Frederick E. Lange

[57] ABSTRACT

Air conditioning apparatus for a tractor cab in which filter and air inlets are disposed in a portion of the roof projecting rearwardly beyond the cab, the air inlet being downwardly disposed so that foreign matter accumulating in the exterior of the filter is free to fall off of the filter and out through the air inlet. The heat exchange means for removing heat from the air is located behind and beneath the cab seat with the air outlet opening into the cab so as to direct cool air into the cab behind and beneath the operator. The cab may have one or more rear corner posts which are hollow and the air passing through the filter is passed through at least one of these hollow corner posts to the heat exchange means. The filter preferably extends transversely with respect to the cab. Two filters may be employed, these filters being spaced apart with a booster fan located between the filters and directing air passing through the filters downwardly to the heat exchange device. Preferably the main air circulating means is located adjacent the heat exchange means. The filter may be of the cylindrical type, the air passing from outside of the cylindrical surface into the cylindrical interior of the filter.

With the arrangement, the dirt not only tends to drop downwardly through the air inlet because of the vibrations occurring during normal operation of the tractor but it also tends to be forced off of the surface of the filter each time that the cab door is closed due to the pressure build-up within the cab being transmitted to the interior of the filter to force air through the filter in a reverse direction.

9 Claims, 5 Drawing Figures

AIR CONDITIONING APPARATUS FOR TRACTOR CAB

BACKGROUND OF THE INVENTION

It has become increasingly common in connection with large tractors to employ means for changing the temperature of the air admitted to the tractor cab. Usually, this takes the form of some means for cooling the air. The provision of air conditioning for a tractor cab of a large tractor adds very little percentagewise to the total cost of the tractor and makes it possible for the operator to operate for much longer periods of time in dusty fields without undue discomfort because of the dust. Furthermore, in many agricultural areas, the temperatures during the year in which such tractors are being used is quite high and unless some means is provided for cooling the air, the interior of the tractor cab can become extremely warm.

A problem arises, however, in connection with air conditioning for such a tractor cab. As pointed out, a large amount of dust is being drawn into the air conditioning inlet, regardless of where this inlet is located. This dust accumulates on the upstream side of the filter and due to the vibration of the tractor, it tends to drop off. In the past, the filters have been located in compartments from which the filter can be rather readily drawn for cleaning purposes, but in which the dirt or other foreign matter dropping off the filter tends to accumulate where it is rather difficult to remove it. For this reason, where the filter has been located in the roof of the tractor, the roof ceiling has been provided with a trap door permitting the opening of the compartment from the bottom to remove the dust. The drawback to this arrangement is that the operator is usually beneath the door and when the door is opened, a large amount of dirt or other foreign matter drops down on the operator and into the interior of the cab.

SUMMARY OF THE INVENTION

The present invention is concerned with air conditioning apparatus for a tractor cab in which the dirt or other foreign matter accumulating on the upstream side of the filter tends to drop away from the tractor. This is accomplished by extending the roof to the rear of the tractor cab, placing the filter in the rearwardly extending portion which projects beyond the tractor cab, and providing a downwardly facing intake opening beneath the filter so that as dirt or other foreign matter drops off the filter, it drops downwardly through the opening.

The invention further provides for locating the heat exchange means for changing the heat content of the air behind and below the level of the driver's seat with the air outlet directed into the cab beneath and behind the driver's seat.

The invention further contemplates providing a cab with hollow rear corner posts, at least one of which acts as a conduit for conducting air from the filter to the heat exchange means.

The invention also provides for the use of filters which extend transversely of the roof of the cab. These filters may be cylindrical, the air being drawn through the walls of the cylinder into the interior of the filter.

It is also contemplated that two spaced filters may be employed a circulating device disposed between the filters for drawing air through the filters and delivering it through one of the hollow rear corner posts to the intake of the main air circulating means.

The invention further contemplates that there be a continuous air passage from the air outlet opening into the cab to the normally downstream side of the filter and that the cab will be sufficiently airtight so that when the cab door is closed abruptly, the increase in pressure within the cab will cause a reverse flow of air through the passage to dislodge foreign matter from the normally upstream side of the filter. Thus, the dirt on the outside of the filter is dislodged not only by reason of the vibration of the tractor but also by reason of the back pressure built up each time that the cab door is closed.

Various other features of the invention will be apparent from a consideration of the accompanying specification, claims and drawing.

DESCRIPTION OF THE PREFERRED EMBODIMENT

Figure 1:
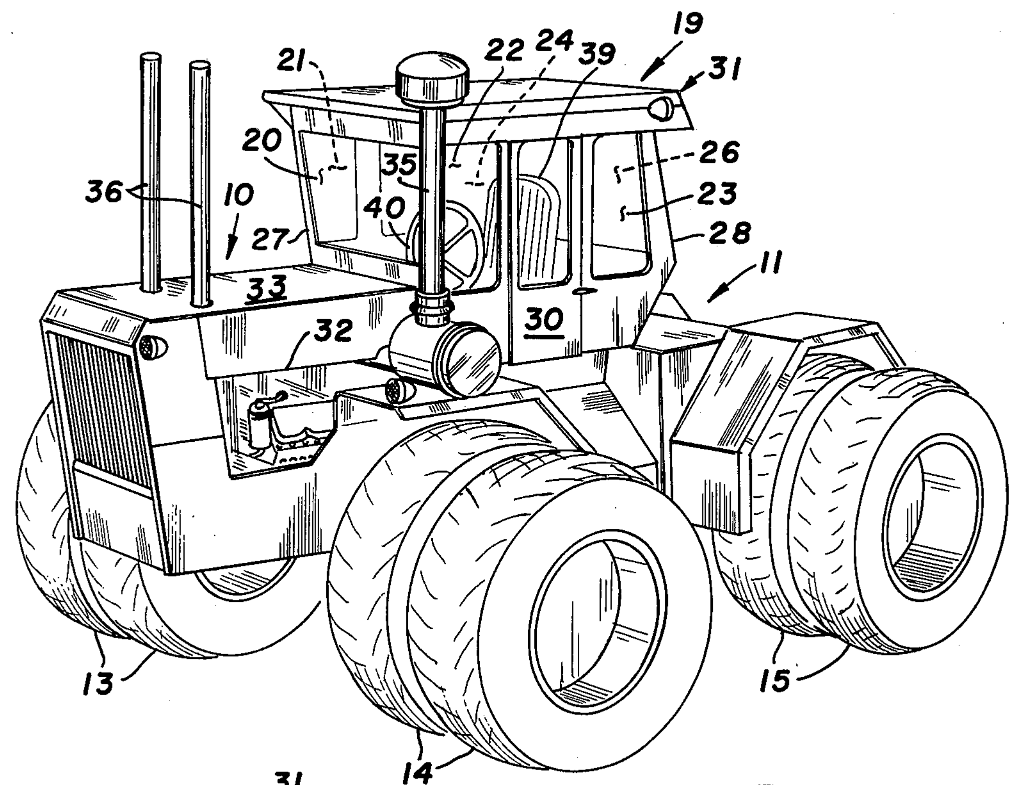
FIG. 1 is a perspective view of a tractor employing my improved air conditioning apparatus.

Referring first to FIG. 1, which is a front perspective view of the tractor employing my improved air conditioning apparatus, the tractor is shown as having a front section 10 and a rear section 11. These two sections are preferably connected together through a pivotal connection which permits relative movement of the two sections about a vertical axis. Turning is effected by the use of two hydraulic cylinders, one on each side of the longitudinal center axis, one of which is extended and the other contracted when turning is desired. A vehicle of this general type is shown in my prior U.S. Pat. No. 3,933,216 granted Jan. 20, 1960.

The front section 10 is supported by two pairs of wheels 13 and 14. I have shown dual wheels although single wheels could be employed. These wheels 13 and 14 are mounted upon an axle, not specifically shown, which is rigidly secured to the frame of the vehicle. The back section 11 is similarly supported by two pairs of wheels, only wheels 15 of which are visible in the drawing. These rear wheels are likewise supported upon an axle (not shown) rigidly secured to the frame with a back section 11. It is to be understood that while I have shown an articulated tractor, the air conditioning apparatus of the present invention can be applied to any type of tractor.

Figure 2:
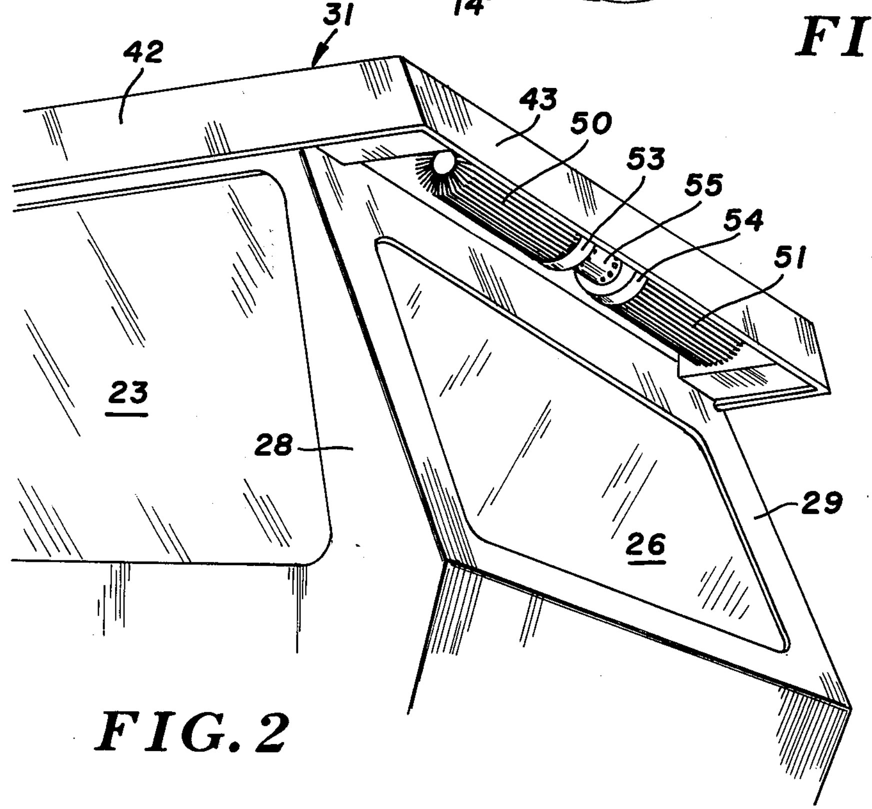
FIG. 2 is a fragmentary view showing the rear of the tractor of FIG. 1 and showing the disposition of the filters of the air conditioning apparatus.

The front section 10 has a body portion comprising a frame upon which is supported an enclosed operator's cab 19 having a windshield 20, front side windows 21 and 22, rear side windows 23 and 24, and a rear window 26. A cab 19 is provided with two front corner posts 27 (only one of which is visible in the drawing) which aid in supporting the windshield 20 and the front side windows 21 and 22. The cab is also provided with two rear corner posts 28 and 29, corner post 29 being only visible in FIGS. 2 and 5. As will be presently explained, corner posts 28 and 29 are hollow. These rear corner posts 28 and 29 aid in supporting the rear window 26 and the rear side windows 23 and 24. The cab is further provided with door 30 and a roof 31. Roof 31, as will be presently explained, plays an important role in connection with the air conditioning apparatus of the present invention.

Referring again to the tractor, this tractor is provided with a typical internal combustion engine a portion of which is visible through an opening 32 in a hood 33. The engine may be any suitable internal combustion engine such as a diesel engine. The engine is provided with an intake pipe 35 which supplies air to the engine and may be associated with an exhaust gas driven turbo supercharger. The engine is also provided with a plurality of exhaust pipes 36 which serve to discharge exhaust gases to an area above the cab 19.

Referring back to the cab 19, the cab encloses the normal operating controls and a seat 39 for the driver. Located in front of the operator's seat 39, in the usual manner, is a steering wheel 40 which is employed for controlling the steering which, as previously explained, may be by operation of hydraulic cylinders to control the relative positions of the two sections 10 and 11.

Figure 4:
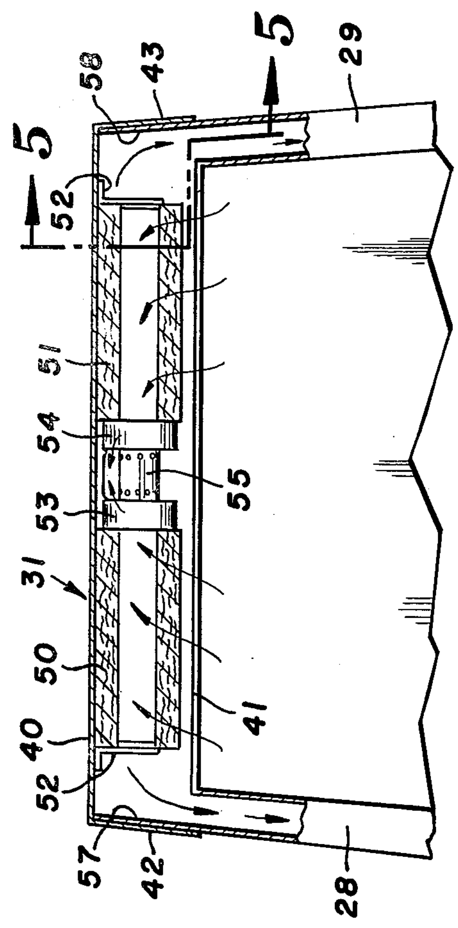
FIG. 4 is a sectional view taken along the line 4—4 of FIG. 3.
Figure 5:
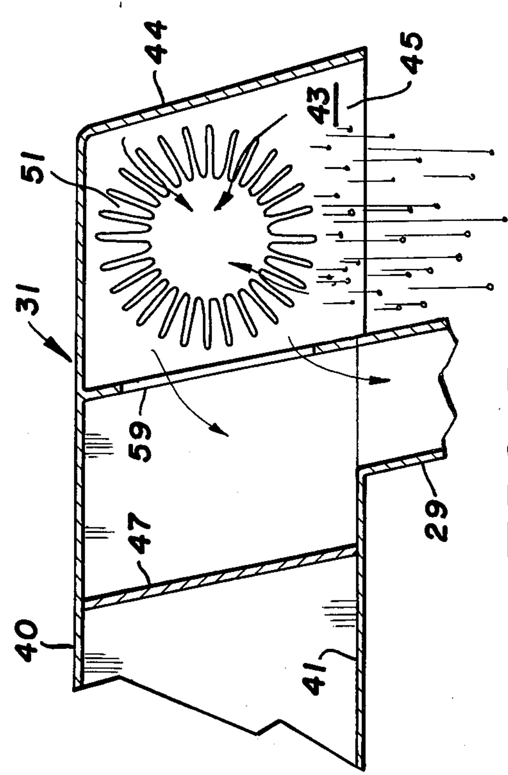
FIG. 5 is a fragmentary sectional view taken along the line 5—5 of FIG. 4.
Figure 3:
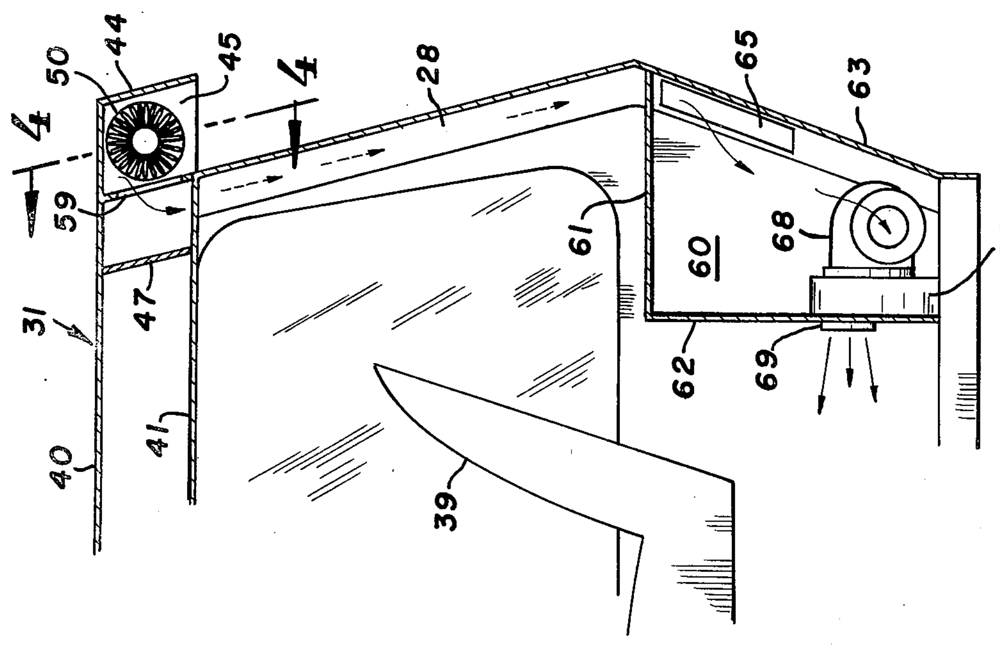
FIG. 3 is a sectional view of the rear portion of the tractor cab showing the relative disposition of the filters, the air ducts, and the exchange apparatus.

Referring now to the roof 31, it will be noted from FIGS. 3 and 4 that this roof comprises an upper horizontal wall 40 and a lower horizontal wall 41 spaced therefrom. There are also two spaced side walls 42 and 43 best shown in FIG. 4. It will be noted from FIG. 3 that the top wall 40 of the roof 31 extends to the rear of the corner posts 28 and 29 so that the roof 31 overhangs the rear of the tractor. The roof is provided with a rear slanting wall 44 which is joined to the upper wall 40 and the side walls 42 and 43 to provide a compartment 45 having a downwardly facing opening at the bottom thereof. Secured between the bottom and top walls 40 and 41 is a partition wall 47 running the full width of the roof and forming the rear wall of rear extension of the compartment 45 as best shown in FIG. 5.

Disposed within the portion of the compartment 45 projecting beyond the rear of the tractor cab are a pair of filters 50 and 51. These filters are cylindrical in character and, as best shown in FIG. 5, are preferably made of corrugated filter material in a conventional manner. The filters 50 and 51 are supported within the chamber 45 in any suitable manner as by means including brackets 52. The air entering the opening at the bottom of chamber 45 is drawn through the corrugated material filters 50 and 51 into the cylindrical interior thereof. Disposed between the inner ends of the filters 50 and 51 are two blowers 53 and 54 which are driven by a motor 55. The blowers 53 and 54 act to draw air through the filters 50 and 51 and discharge it into the rear of the longitudinal compartment bounded by the wall 47. As will be presently explained, the blowers 53 and 54 act as booster blowers aiding in delivering the air to the vicinity of the air conditioning unit to be presently described.

As has been indicated previously, the two corner posts 28 and 29 are preferably hollow. These posts act as conduits through which the air is delivered to the air conditioning unit. Each of the posts 28 and 29 terminate at the bottom wall 41 of the roof structure 31 except for their outer walls which extend upwardly through the roof structure 31 as indicated by the reference numeral 57 in connection with the corner post 28 and reference numeral 58 in connection with the corner post 29. The two corner posts 28 and 29 are open at the upper end and are in communication with the chamber 45. As a result, the air drawn by blowers 53 and 54 through the filters 50 and 51 and passed into the rear of the chamber 45 through an opening in a wall 59 can enter the upper ends of the hollow corner posts 28 and 29.

Referring now to FIG. 3, it will be noted that the corner posts 28 and 29 extend downwardly and enter a plenum chamber 60 bounded by an upper wall 61, a front wall 62, and a rear wall 63 constituting a portion of the rear wall of the cab. Each of the corner posts 28 and 29 is provided at its lower portion with an opening 65 through which the air may pass into the plenum chamber 60.

Located within the plenum chamber is a heat exchange unit 66 to the intake of which is connected the output of a motor operated blower 68 having an intake communicating with the interior of the plenum chamber 60. The heat exchange unit 66 may be any suitable means for changing the heat content of the air passing therethrough. Normally, this will take the form of a refrigeration unit which will cool the air as it passes therethrough. The condenser may be located at any suitable point for dissipating the heat passing therethrough. The heat exchange unit 66 has an outlet 69 which it will be noted discharges the air into a space behind and beneath the seat 39. Thus, the cold air is introduced adjacent the floor of the cab to avoid disagreeable drafts upon the operator. The air so discharged may escape through various small openings such as that existing between the edges of the door and the door frame of the cab 19. As will be explained, however, the door fits relatively closely with the door frame although the fit is not sufficiently close to prevent the air escaping around the edges during normal operation of the heat exchange unit 68.

It will be clear from the above that air is drawn in through the opening at the bottom of chamber 45 to the rear of the tractor and is drawn by the blowers 53 and 54 into the interior of the filters 50 and 51. In this process, dirt and various foreign matter in the air is deposited on the outside of the filter material. The air passes into the rear of the chamber 45 and then down through the hollow corner posts 28 and 29 and from there into the plenum chamber 60. The passage of the air is facilitated by the blower 68 which draws the air through the corner posts 28 and 29 and forces it through heat exchange unit 66 and out through the outlet 69.

A very important feature of the present invention is that the filters 50 and 51 are disposed over a downwardly facing opening to the rear of the cab. Thus, as indicated in FIG. 5, there is a tendency for the dirt and other foreign matter collecting on the outside of the filters 50 and 51 to drop off of the filters as the tractor is moved along. The movement of the tractor causes a certain amount of vibration tending to jar the dirt loose. In previous constructions, this dirt would accumulate on a wall such as wall 41 of the roof structure 31 and it would be necessary periodically to clean out the area above the wall 41 through the use of a hinged panel. With the present construction, the necessity of cleaning out such a compartment is avoided. The dirt on the outside of the filters 50 and 51 drops off and drops down behind the cab 19.

The removal of the dirt from the exterior of the cab is further facilitated by the action which occurs each time one of the doors 30 is closed. It will be noted that there is a continuous air passage from the interior of the cab through the outlet 69, the heat exchange unit 66, the blower 68, the plenum chamber 60, the corner posts 28 and 29, the blowers 53 and 54, and through the filters 50 and 51 to the rear of the chamber 45. As previously pointed out, the doors 40 and 41 fit relatively closely. The entire cab 19 is designed to be relatively air tight so as to exclude any dust and provide a certain amount of soundproofing. Thus, if either of the doors 30 is opened and is then closed abruptly, the air pressure within the cab 19 will rise causing a back pressure which forces air to flow through the outlet 69 and through the air passage just traced. The result will be that air is forced in an inverse direction through the filters 50 and 51. This further tends to dislodge any dirt or foreign matter on the exterior of the filters 50 and 51 and to tend to clean the filters. Thus, each time that one of the doors 30 is closed, dust or other foreign matter is forced away from the external surfaces of filters 50 and 51 and this dirt drops away as depicted in FIG. 5.

CONCLUSION

It will be seen that I have provided an air conditioning apparatus for a tractor in which it is possible to maintain the filters relatively clean despite the dusty conditions which customarily prevail in the fields in which such tractors are used. The dirt or other foreign matter accumulating on the filters tends to be dislodged automatically and to drop away from the tractor where it will cause no harm.

While I have shown a specific embodiment of my invention, it is to be understood that this is for purposes of illustration only and that the scope of my invention is limited solely by that of the appended claims.

I claim:

1. In combination, a tractor having an operator's cab comprising a plurality of side walls and a roof, said side walls including a rear wall, and said roof having a portion projecting rearwardly beyond said rear wall, an air conditioner for said cab including an air inlet, a filter, heat exchange means for changing the heat content of the air passing therethrough, an air outlet opening into said cab and air circulating means for causing air to enter said inlet and pass through said filter, said heat exchange means and out through said air outlet into said cab, said rearwardly projecting portion of said roof having a compartment therein for said filter and a downwardly disposed air inlet disposed to the rear of said rear wall, and means for mounting said filter in said compartment above said air inlet so that foreign matter accumulating on the exterior of said filter is free to fall off of said filter and out through said air inlet.

2. The combination of claim 1 in which said filter extends transversely of said roof compartment.

3. The combination of claim 2 in which the filter is a cylindrical filter.

4. The combination of claim 1 in which the cab has an operator's seat therein and in which said air outlet is located beneath and to the rear of said seat.

5. The combination of claim 1 in which the cab has an operator's seat therein and in which said heat exchange means, said air outlet and said air circulating means are located beneath and to the rear of said seat.

6. The combination of claim 1 in which said cab has rear corner posts which are hollow, in which said heat exchange means and said air outlet are located in a lower portion of said cab, and in which air passing through said filter is passed through at least one of said hollow rear corner posts to said heat exchange means.

7. The combination of claim 6 in which there are a plurality of spaced filters and in which there is a further air circulating device disposed between said filters for drawing air therethrough and delivering it through at least one of said hollow rear corner posts to the intake of said previously named air circulating means.

8. The combination of claim 1 in which the cab has an operator's seat therein and rear corner posts which are hollow, in which said heat exchange means and said air outlet are located beneath and to the rear of said seat, and in which air passing through said filter is passed through at least one of said hollow rear posts to said heat exchange means.

9. The combination of claim 1 in which there is a continuous air passage from the air outlet opening into the cab to the normally downstream side of the filter and in which the cab is sufficiently air tight that when the cab door is closed abruptly, the increase in pressure within the cab causes a reverse flow of air through said passage to dislodge foreign matter from the normally upstream side of the filter.

* * * * *